United States Patent Office 2,787,607
Patented Apr. 2, 1957

2,787,607

BIS(2-HYDROXY-3-BENZOYL PHENYL)METHANES AND COMPOSITIONS CONTAINING THE SAME

Carl B. Havens, Hope, and John R. Mathieson, Rhodes, Mich., assignors to The Dow Chemical Company, Midland, Mich., a corporation of Delaware No Drawing. Application November 3, 1955,
Serial No. 544,818

4 Claims. (Cl. 260—45.95)

This invention relates to new organic compounds and to polymeric compositions containing the same. More particularly, it relates to new organic compounds finding utility as light stabilizers for haloethylene polymers.

Haloethylene polymers are known to be highly sensitive to the effects of elevated temperatures and of light and under prolonged exposure to heat and light may become so degraded as to be commercially useless. It has been common practice to blend certain compounds with the polymer to stabilize it against the degradative effects of heat and light.

Several of such compounds, however, are colored materials which impart an objectionable initial color to the stabilized composition and thus prevents the production of a commercially saleable white composition.

Still other disadvantages of many of the previous compounds are a high odor level and volatility. Obviously, any odor in the stabilizer will be transferred to the stabilized composition. When volatile stabilizers are employed the stabilizers volatilize out of the composition, leaving the composition in time unprotected against the degradative effects of light, particularly ultra-violet light. In addition, all of the compounds vary in their ability to absorb ultra-violet light and it is impossible to predict the effectiveness of any particular compound with any degree of certainty, and even then some of the compounds lose some of their effectiveness for absorbing ultra-violet light over a prolonged period of time.

In view of the above problems it would be desirable and it is the principal object of this invention to provide a new group of organic compounds having the stated utility.

It is a further object to provide a polymeric composition stabilized against the degradative effects of light by means of such compounds.

It is a still further object to provide a group of such compounds which have little or no color and have a low odor level.

Another object is to provide a group of such compounds which have low volatility.

The above and related objects are accomplished by means of a group of compounds having the general formula:

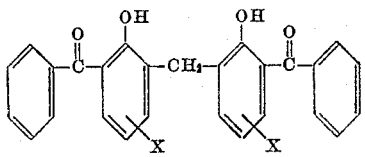

wherein X is selected from the group consisting of H, Cl and alkyl having from 1 to 4 carbon atoms, and of compositions containing such compounds together with haloethylene polymers.

The compounds are easily prepared by a rearrangement of a corresponding benzoic acid ester. The esters are easily prepared by treating the corresponding bisphenol with caustic alkali and benzoyl chloride. Thus, to prepare the compound wherein X is chlorine, p,p'-dichlorobisphenol, caustic soda and benzoyl chloride are heated to produce methane bis-(p-chlorophenyl)dibenzoate. As typical of the rearrangement, 0.1 mole of methane bis-(p-chlorophenyl)-dibenzoate and 0.3 mole of aluminum chloride were heated together at 160°–168° C. for 20 minutes. The reaction mixture was then cooled, ground, and slowly added to a stirred excess of ice and HCl. The product, bis(2-hydroxy-3-benzoyl-5-chlorophenyl)methane, was filtered from the mixture, recrystallized from toluene, and washed with alcohol. The product was a faintly yellow solid having a melting point of 165.5°–166.1° C.

The compounds were evaluated as light stabilizers for haloethylene polymers. Because of their low odor level and low volatility they produced compositions that were more merchandisable than compositions prepared from previous stabilizers. The effectiveness of the compounds as stabilizers will be more apparent from the following illustrative example in which all parts are by weight.

EXAMPLE

A series of samples was prepared from a basic formulation consisting of 95 parts of a copolymer prepared from 85 percent vinylidene chloride and 15 percent vinyl chloride and 5 parts of acetyl triethyl citrate as a plasticizer. To some samples of the basic formulation were added varying amounts of the compounds of this invention; to other samples were added varying amounts of 2-hydroxy-5-chlorobenzophenone, a compound known to be an effective light stabilizer for the polymer; and a third group of samples had no stabilizer added. The samples were compression molded to form sheets 0.01 inch thick. The moldings were exposed to direct sunlight in the State of Florida for one month and for three months after which the color of each molding was checked against its original color. The results are listed in the following table.

Table

| Compound Added | Percent Added | Original color | Color after 1 month | Color after 3 months |
|---|---|---|---|---|
| None | | colorless | brown | brown. |
| Bis(2-hydroxy-3-benzoyl-5-chlorophenyl)methane. | 1 | light yellow | light yellow | light brown. |
| Do | 3 | ___do___ | ___do___ | very slight darkening. |
| 2-hydroxy-5-chlorobenzophenone. | 1 | ___do___ | slight darkening. | brown. |
| Do | 2 | ___do___ | ___do___ | light brown. |
| Do | 3 | ___do___ | light yellow | Do. |

As can be seen from the results, the compound of this invention was more effective in stabilizing the composition than one of the best prior stabilizers.

The compounds will stabilize other haloethylene polymers including vinylidene chloride polymers and copolymers and vinyl chloride polymers and copolymers. The most useful range of concentration of the new compounds in such compositions is from 0.25 to 6 percent by weight.

We claim:

1. As a new organic compound, a bis(2-hydroxy-3-benzoyl phenyl)methane having the general formula:

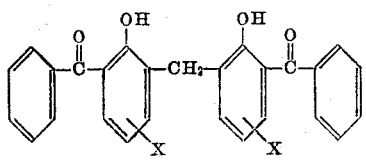

wherein X is selected from the group consisting of hydrogen, chlorine, and alkyl groups containing from 1 to 4 carbon atoms.

2. A compound having the formula

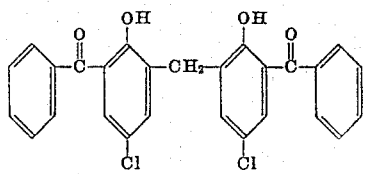

characterized by being a yellow solid and having a melting point of 165°–166° C.

3. A thermoplastic composition comprising a thermoplastic haloethylene polymer and from 6 to 0.25 percent of the weight of said polymer of a compound having the general formula:

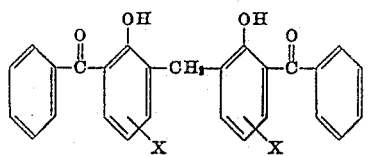

wherein X is selected from the group consisting of hydrogen, Cl, and alkyl groups containing from 1 to 4 carbon atoms.

4. A thermoplastic composition comprising a haloethylene polymer and from 0.25 to 6 percent of the weight of said polymer of bis(2-hydroxy-3-benzyl-5-chlorophenyl)-methane.

No references cited.